W. S. BROWN.
VALVE.
APPLICATION FILED AUG. 19, 1909.

949,697.

Patented Feb. 15, 1910.

Witnesses
W. A. Williams.
H. S. Imrie.

Inventor
Walter S. Brown
By Robertson & Johnson
Attorneys

UNITED STATES PATENT OFFICE.

WALTER S. BROWN, OF BETHLEHEM, PENNSYLVANIA, ASSIGNOR TO AUGUSTUS F. NAGLE, OF SOUTH BETHLEHEM, PENNSYLVANIA.

VALVE.

949,697.   Specification of Letters Patent.   Patented Feb. 15, 1910.

Application filed August 19, 1909.   Serial No. 513,640.

*To all whom it may concern:*

Be it known that I, WALTER S. BROWN, a citizen of the United States, and a resident of Bethlehem, in the county of Northampton and State of Pennsylvania, have invented certain new and useful Improvements in Valves, of which the following is a specification.

This invention relates to certain new and useful improvements in valves for use in pumps, etc., and more particularly to the construction of the upper plate and to the manner of securing a renewable rubber seat or seats thereto.

The object of the invention is to provide a construction which will strengthen the pressure valve in the pumping engines of city water works, such pressure being from 80 to 200 pounds per square inch, and at the same time provide a valve of rubber or other suitable material which will be durable and easy of economical renewal.

In the preferred embodiment of my invention I employ two rings made of rubber or other suitable material which are held in place by means of a double flanged nut firmly clasping the two thin rubber ring seats or facings. The combination of the plate, the flanged nut, and intervening materials forms a truss or deep girder-like construction which brings strength, thus giving durability and at the same time making economic renewals possible.

With this brief statement, my invention may be said to consist of a valve as shown in its preferable embodiment in the accompanying drawings and as will now be more fully described.

Figure 1:
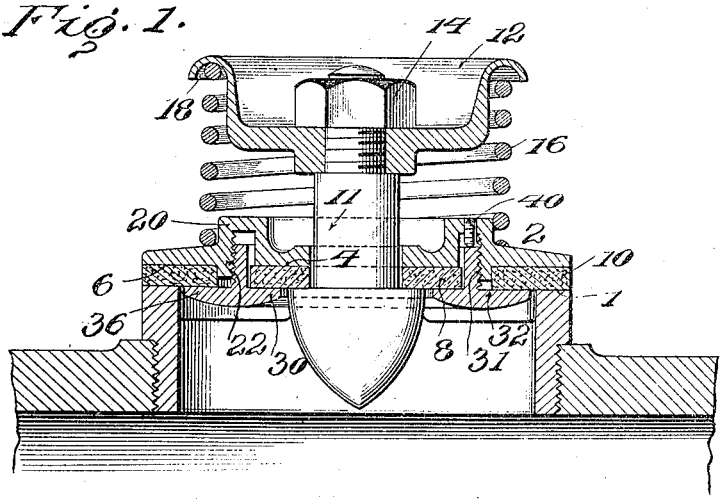
Figure 2:
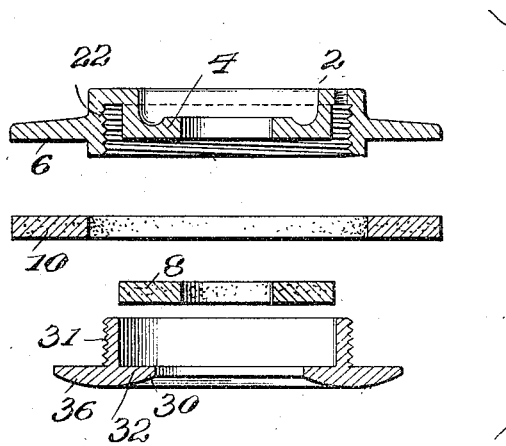

In the aforesaid drawings which form part hereof: Figure 1 is a vertical central section of a valve made in accordance with my improvement. Fig. 2 is a detail of the rings and the double flanged nut for securing them in position.

Referring now to the details of the drawings by numerals: 1 designates the valve seat of ordinary construction such as may be found in general use. Above this seat is located a plate 2 which is preferably of the novel construction shown in Fig. 1 in that it is provided with two seats 4 and 6 to receive two facings 8 and 10 of rubber or other suitable material, these facings being in the form of thin rings as illustrated.

Projecting above the plate 2 is the ordinary guide stud 11 (supported with the usual spider, not shown) with which stud 11 coacts an upper plate 12 to which it is secured by a nut 14, a spring 16 surrounding the upper plate 12 and coacting with said plate and the companion plate 2 to normally hold the plate 2 seated on the seat 1. The upper plate 12 is formed with an overhanging flange 18 but this upper plate 12, the spring 16, and the facing 10 are such as are now in common use and therefore need no further description. The plate 2, however, as before stated, is of novel construction and is preferably provided with an exterior annular flange 20 with which the spring 16 is arranged to coact as clearly seen in the drawings. This annular flange 20 is recessed on its under side and interiorly screw threaded as indicated at 22. Coacting with the under side of the plate 2 and adapted to hold the rings 8 and 10 in position is a double flanged nut 30 having its annular portion threaded at 31 to screw into the interiorly threaded aperture 22 of the plate 2. The double flanged nut 30, as its name implies, has two annular flanges one projecting inwardly and designated by the numeral 32 and the other outwardly and designated 36. The construction is such that when two rings of rubber or other suitable material are placed on the seats 4 and 6 of the plate 2, the double flanged nut 30 may be screwed into the annular aperture in the plate 2 until its flanges 34 and 36 contact with the rubber rings 8 and 10 and thereby hold the same securely in position. A set screw 40 may be employed to hold the double flanged nut in locked position when once adjusted.

From the foregoing and accompanying drawings it will be seen that I have produced a valve of very simple construction and of great strength and one in which it is possible to make renewals at small cost and with facility.

What I claim as my invention is:

1. A pump valve comprising a plate having two circumferential seats, a ring facing for each seat, and a nut screwing onto the plate and having flanges therefor on opposite sides thereof, said flanges coacting with said ring facings to hold the same against their seats, substantially as described.

2. A pump valve comprising a plate having circumferential and central hub seats, facings formed in two annular rings, one for each seat, and a double flanged nut threaded onto said plate and firmly holding said rings, and strengthening the plate, substantially as described.

3. A pump valve comprising a plate having an annular interiorly threaded recess therein and a circumferential seat on each side thereof, facings held against said seats, and a double flanged nut screwing into said annular recess and firmly holding said facings against their seats, and strengthening the plate, substantially as described.

4. A pump valve comprising a plate having an annular interiorly threaded recess therein and a circumferential seat on each side thereof, facings held against said seats, and a double flanged nut screwing into said annular recess and firmly holding said facings against their seats, and a set screw for locking said flanged nut in position, substantially as described.

5. A pump valve comprising a plate having an annular projection on one side forming a retaining means for a spring, an interiorly threaded aperture on the other side of the plate formed in said annular projection and two circumferential seats, a double flanged nut screwing into said annular recess, the flanges on said nut holding the facings against their seats, substantially as described.

Signed by me at South Bethlehem, Pa., this 11th day of August 1909.

WALTER S. BROWN.

Witnesses:
A. F. NAGLE,
S. B. GASDASKA